(12) United States Patent
Xue et al.

(10) Patent No.: US 12,212,835 B2
(45) Date of Patent: Jan. 28, 2025

(54) CAMERA SUPPORT, CAMERA ASSEMBLY, AND MOBILE TERMINAL

(71) Applicant: Honor Device Co., Ltd., Shenzhen (CN)

(72) Inventors: Kangle Xue, Shenzhen (CN); Yan Wang, Shenzhen (CN); Bin Yan, Shenzhen (CN); Yihe Zhang, Shenzhen (CN); Weirong Su, Shenzhen (CN); Hao Yang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/040,445

(22) PCT Filed: Sep. 9, 2022

(86) PCT No.: PCT/CN2022/118185
§ 371 (c)(1),
(2) Date: Feb. 3, 2023

(87) PCT Pub. No.: WO2023/071555
PCT Pub. Date: May 4, 2023

(65) Prior Publication Data
US 2024/0259664 A1 Aug. 1, 2024

(30) Foreign Application Priority Data
Oct. 30, 2021 (CN) .......................... 202111278307.4

(51) Int. Cl.
*H04N 23/57* (2023.01)
*H04M 1/02* (2006.01)
(Continued)

(52) U.S. Cl.
CPC .......... *H04N 23/57* (2023.01); *H04M 1/0264* (2013.01); *H04N 23/51* (2023.01); *H04N 23/54* (2023.01); *H04N 23/90* (2023.01)

(58) Field of Classification Search
CPC ........ H04N 23/57; H04N 23/51; H04N 23/54; H04N 23/90; H04M 1/0264
See application file for complete search history.

(56) References Cited

U.S. PATENT DOCUMENTS 9,554,041 B1 1/2017 Shin et al.
10,412,204 B2 9/2019 Yi et al.
(Continued)

FOREIGN PATENT DOCUMENTS

CN 106851054 A 6/2017
CN 206294254 U 6/2017
(Continued)

*Primary Examiner* — Twyler L Haskins
*Assistant Examiner* — Angel L Garces-Rivera
(74) *Attorney, Agent, or Firm* — Slater Matsil, LLP

(57) ABSTRACT

A camera assembly includes a first camera module, a second camera module, and a camera support, where the camera support includes a first body and a second body, the first body and the second body are arranged side by side, the first body includes a first accommodating space, and the second body includes a second accommodating space. The first camera module is accommodated in the first accommodating space, and the second camera module is accommodated in the second accommodating space. The first camera module and the second camera module are separated by a gap or a common side wall of the first accommodating space and the second accommodating space.

20 Claims, 10 Drawing Sheets

(51) Int. Cl.
  *H04N 23/51* (2023.01)
  *H04N 23/54* (2023.01)
  *H04N 23/90* (2023.01)

(56) References Cited

U.S. PATENT DOCUMENTS

| | | |
|---|---|---|
| 10,771,667 B2 | 9/2020 | Jung et al. |
| 2021/0029276 A1 | 1/2021 | Yao |
| 2021/0092261 A1 | 3/2021 | Miller et al. |
| 2021/0099676 A1 | 4/2021 | England et al. |

FOREIGN PATENT DOCUMENTS

| | | |
|---|---|---|
| CN | 107046588 A | 8/2017 |
| CN | 107102498 A | 8/2017 |
| CN | 207802017 U | 8/2018 |
| CN | 207802049 U | 8/2018 |
| CN | 108513055 A | 9/2018 |
| CN | 209146624 U | 7/2019 |
| CN | 209313926 U | 8/2019 |
| CN | 110417954 A | 11/2019 |
| CN | 210137372 U | 3/2020 |
| CN | 210327761 U | 4/2020 |
| CN | 210670290 U | 6/2020 |
| CN | 212273485 U | 1/2021 |
| CN | 112492129 A | 3/2021 |
| CN | 112602309 A | 4/2021 |
| CN | 113067972 A | 7/2021 |
| EP | 3057306 A1 | 8/2016 |
| WO | 2019015625 A1 | 1/2019 |
| WO | 2020047754 A1 | 3/2020 |

CAMERA SUPPORT, CAMERA ASSEMBLY, AND MOBILE TERMINAL

CROSS-REFERENCE TO RELATED APPLICATIONS

This application is a national stage of International Application No. PCT/CN2022/118185, filed on Sep. 9, 2022, which claims priority to Chinese Patent Application No. 202111278307.4, filed on Oct. 30, 2021. The disclosures of both of the aforementioned applications are hereby incorporated by reference in their entireties.

TECHNICAL FIELD

This application relates to the field of camera-related technologies, and in particular, to a camera support, a camera assembly, and a mobile terminal.

BACKGROUND

Currently, some mobile terminals, such as a mobile phone and a tablet computer, have a photographing function and are each provided with two or more cameras. When the camera is assembled with a mobile phone housing, it is required to first fasten a camera module in a camera support. After the camera module is fastened to the support through dispensing, the camera support is mounted in an entire device.

Since an existing mobile phone is limited in space, or due to appearance considerations, it is required to arrange a plurality of groups of cameras compactly, so as to minimize the space occupied by the mobile phone. However, when the cameras are assembled to the support, a certain transverse space is needed, which does not facilitate space utilization of the mobile phone.

SUMMARY

This application provides a camera assembly, so as to implement compact arrangement of a plurality of groups of cameras and resolve a technical problem that a plurality of cameras occupy an excessive space of a terminal.

This application further provides a camera support and a mobile terminal.

In a first embodiment of this application, the camera assembly includes a first camera module, a second camera module, and a camera support, where the camera support is configured to fasten and protect the first camera module and the second camera module; the camera support includes a first body and a second body, the first body includes a first accommodating space, the second body includes a second accommodating space, and the first accommodating space and the second accommodating space are separated by a spacing section of the first body; a surface that is of the spacing section and that is located in the second accommodating space is provided with an adhesive groove, and the adhesive groove is recessed in a direction of the first accommodating space; and the first camera module is accommodated in the first accommodating space and is bonded and fastened by using an adhesive tape, the second camera module is accommodated in the second accommodating space, and the adhesive groove is configured to accommodate the adhesive tape, so that the adhesive tape bonds the second camera module to the spacing section. The first body includes a first side wall and a partition wall, the second body includes a second side wall, and the partition wall includes the spacing section; the first side wall is located on one side of the partition wall and connected to two opposite ends of the partition wall, the first side wall and the partition wall enclose the first accommodating space, the second side wall is located on the other side of the partition wall and connected to the spacing section, the second side wall and the spacing section enclose the second accommodating space, and the first accommodating space and the second accommodating space are located on two opposite sides of the partition wall and separated by the spacing section.

A distance between the first camera module and the second camera module according to this application is a thickness of the spacing section, and the adhesive tape for fastening the second camera module does not occupy the space in the arrangement direction of the first camera module, thereby reducing the distance between the first camera module and the second camera module. The camera assembly according to this embodiment implements compact arrangement of a plurality of groups of cameras, thereby reducing a size of the camera assembly, preventing the camera assembly from occupying an excessive space of the terminal, and conforming to an existing space utilization design of the mobile terminal.

In an embodiment, a surface that is of the spacing section and that faces the first accommodating space is provided with a groove, an adhesive tape is arranged in the groove, and the adhesive tape in the groove bonds the first camera module to a groove wall of the groove; and in a length direction of the spacing section, the groove is completely staggered with the adhesive groove, or the groove at least partially overlaps the adhesive groove. The groove and the adhesive groove are completely staggered or at least partially overlap, so that the first camera module and the second camera module have a smaller distance therebetween and are more compact, and the size of the camera assembly in the arrangement direction of the first camera module and the second camera module is reduced.

In an embodiment, the first body includes a first side wall and a partition wall, where the first side wall and the partition wall enclose the first accommodating space, the partition wall includes a first surface, a second surface facing away from the first surface, and a side surface that connects the first surface to the second surface, the groove is located at an edge of the first surface, a notch of the groove runs through the side surface, the adhesive groove is located at an edge of the second surface, and a notch of the adhesive groove runs through the side surface. The notch of the groove runs through the side surface and the notch of the adhesive groove runs through the side surface, that is, an edge of an upper side or a lower side of the camera support, so that the camera module is fastened to the camera support through dispensing.

In an embodiment, a wall surface that is of the first side wall and that faces the first accommodating space is provided with a first adhesive groove, an adhesive tape is arranged in the first adhesive groove, and the adhesive tape is bonded between the first camera module and a groove wall of the first adhesive groove; and the second body includes a second side wall, a wall surface that is of the second side wall and that faces the second accommodating space is provided with a second adhesive groove, an adhesive tape is arranged in the second adhesive groove, and the adhesive tape is bonded between the second camera module and a groove wall of the second adhesive groove. The adhesive tapes are arranged in the adhesive grooves of the first side wall and the second side wall, so that there is no need to reserve a gap between the first camera module and the first side wall for dispensing, and there is no need to reserve a gap between the second camera module and the second side wall for dispensing, thereby reducing an overall size of the camera assembly.

In a second embodiment of this application, the camera assembly includes a first camera module, a second camera module, and a camera support, where the camera support includes a first body and a second body, and the first body and the second body are arranged in a width direction of the camera assembly;

the first body includes a first side wall and a connecting wall, where the first side wall is connected to the connecting wall to enclose a first accommodating space, the connecting wall is provided with a through groove, and the through groove runs through the connecting wall in the width direction of the camera assembly and communicates with the first accommodating space;

the second body includes a second side wall enclosing a second accommodating space, where the second side wall includes two free ends, an opening is formed between the two free ends, and the opening communicates with the second accommodating space; and a limiting wall is connected between the two free ends, and a projection of the limiting wall in a thickness direction of the camera assembly is located in the opening, or the limiting wall is located in the opening; and in the thickness direction of the camera assembly, two free ends of the second side wall extend into the through groove, side surfaces of the two free ends are connected to a surface of a side wall of the through groove, the through groove coincides with the opening, the first camera module is accommodated in the first accommodating space, the second camera module is accommodated in the second accommodating space, a gap is formed between the second camera module and the first camera module, and the gap is located at the opening.

In this embodiment, the second body is provided with the opening that communicates with the second accommodating space, and the first body is provided with the through slot for inserting the second body, which is equivalent to the following case: The side wall of the first accommodating space and the side wall of the second accommodating space are embedded in each other, and an inner space of the first accommodating space directly communicates with an inner space of the second accommodating space, without spacing by another side wall, so that the first camera module and the second camera module are arranged more compactly in an X-axis direction. In addition, after the second camera module is mounted in the second accommodating space, the gap between the second camera module and the first camera module in the first accommodating space is smaller than the thickness of the connecting wall between the first accommodating space and the second accommodating space, thereby preventing the camera assembly from occupying an excessive space of the terminal, and conforming to an existing space utilization design of the mobile terminal. That the through groove coincides with the opening means that an area of the through groove other than the positions occupied by the two free ends partially or completely coincides with the opening.

In an embodiment, an end face of each free end includes a top area, two opposite ends of the limiting wall are connected to the top areas of the end faces of the two free ends respectively, the connecting wall includes a top surface, and the limiting wall is located above the top surface in the thickness direction of the camera assembly; and in the width direction of the camera assembly, the limiting wall extends out in a direction of the first body and is staggered with the connecting wall. In this way, the space of the through groove in the first body can be easily used, and a periphery of the second camera module can be positioned by the side wall through the fitting between the limiting wall and the second side wall, thereby ensuring stability in fastening the second camera module.

In an embodiment, the limiting wall includes a wall surface facing the second accommodating space, and the connecting wall includes a wall surface facing the first accommodating space; and in the width direction of the camera assembly, the limiting wall and the connecting wall are staggered, and the wall surface of the limiting wall faces away from the wall surface of the connecting wall. The wall surface of the limiting wall is partially staggered with the wall surface of the connecting wall, that is, a projection of the limiting wall on a Z-axis covers part of the through groove, or covers part of the opening; the second camera module is mounted in the second accommodating space, and a side that is of the second camera module and that is far away from the second side wall is abutted against and limited by the wall surface of the limiting wall, so as to prevent the second camera module from entering the first accommodating space through the through groove and the opening, and ensure that the gap is formed between the first camera module and the second camera module.

In an embodiment, the second side wall includes a second sub-side wall and two second sub-end walls, where the two second sub-end walls are connected to two opposite ends of the second sub-side wall respectively, the second sub-side wall and the two second sub-end walls enclose the second accommodating space, and the free end is an end of the second sub-end wall far away from the second sub-side wall; and wall surfaces of both the second sub-side wall and the two second sub-end walls are provided with a first adhesive groove facing the second accommodating space, the first adhesive groove extends to the wall surface of the limiting wall, an adhesive tape is arranged in the first adhesive groove, and the adhesive tape is bonded between a groove wall of the first adhesive groove and the second camera module. The first adhesive groove is provided in the second accommodating space to accommodate the adhesive tape, so that there is no need to occupy the space between the camera support and the camera module, thereby avoiding increasing the size of the camera support.

In an embodiment, an adhesive layer is arranged in the gap between the first camera module and the second camera module, the adhesive layer connects the first camera module to the second camera module, and the adhesive layer enables the first camera module and the second camera module to be fastened in the camera support more stably.

In an embodiment, the camera assembly further includes a third body and a third camera module, and the third body includes a third side wall, the third side wall is connected to the first side wall to enclose a third accommodating space for accommodating the third camera module, a wall surface that is of the first side wall and that is located in the third accommodating space is provided with an adhesive accommodating groove, and an adhesive tape is arranged in the adhesive accommodating groove and is used to bond the third body to the third camera module; or the third side wall is connected to the second side wall to enclose a third accommodating space for accommodating the third camera module, a wall surface that is of the second side wall and that is located in the third accommodating space is provided with an adhesive accommodating groove, and an adhesive tape is arranged in the adhesive accommodating groove and is used to bond the third body to the third camera module.

An embodiment of this application provides a mobile terminal, including a body and the foregoing camera assembly, where the camera assembly is mounted on the body, and a lens of a first camera module and a lens of a second camera module are exposed out of the body. The lens of the first camera module and the second camera module of the mobile terminal are arranged compactly, which is conducive to utilization of a space of the mobile terminal and can reduce a size of the mobile terminal in a width or length direction.

An embodiment of this application provides a camera support for accommodating a first camera module and a second camera module, where the camera support includes a first side wall, a second side wall, and a partition wall, and the partition wall includes a spacing section;
    the first side wall is located on one side of the partition wall and connected to two opposite ends of the partition wall, the first side wall and the partition wall enclose the first accommodating space, the second side wall is located on the other side of the partition wall and connected to the spacing section, the second side wall and the spacing section enclose the second accommodating space, and the first accommodating space and the second accommodating space are located on two opposite sides of the partition wall and separated by the spacing section; and
    a surface that is of the spacing section and that is located in the second accommodating space is provided with an adhesive groove, and the adhesive groove is recessed in a direction of the first accommodating space; and the first camera module is accommodated in the first accommodating space and is bonded and fastened by using an adhesive tape, the second camera module is accommodated in the second accommodating space, and the adhesive groove is configured to accommodate the adhesive tape, so that the adhesive tape bonds the second camera module to the spacing section, thereby ensuring compactness between the two camera modules.

In an embodiment, a surface that is of the spacing section and that faces the first accommodating space is provided with a groove, an adhesive tape is arranged in the groove, and the adhesive tape in the groove bonds the first camera module to a groove wall of the groove; and in a length direction of the partition wall, the groove is completely staggered with the adhesive groove, or the groove at least partially overlaps the adhesive groove.

An embodiment of this application provides a camera support for accommodating a first camera module and a second camera module, where the camera support includes a first body and a second body,
    the first body includes a first side wall and a connecting wall, where the first side wall is connected to the connecting wall to enclose a first accommodating space, the connecting wall is provided with a through groove, and the through groove runs through the connecting wall in a width direction of the camera assembly and communicates with the first accommodating space,
    the second body includes a second side wall enclosing a second accommodating space, where the second side wall includes two free ends, an opening is formed between the two free ends, and the opening communicates with the second accommodating space; and a limiting wall is connected between the two free ends, and a projection of the limiting wall in a thickness direction of the camera assembly is located in the opening, or the limiting wall is located in the opening; and
    in the thickness direction of the camera assembly, two free ends of the second side wall extend into the through groove, side surfaces of the two free ends are connected to a surface of a side wall of the through groove, the through groove coincides with the opening, the first camera module is accommodated in the first accommodating space, the second camera module is accommodated in the second accommodating space, a gap is formed between the second camera module and the first camera module, and the gap is located at the opening, thereby ensuring compactness between the two camera modules.

In an embodiment, an end face of each free end includes a top area, and two opposite ends of the limiting wall are connected to the top areas of the end faces of the two free ends respectively, and
    the connecting wall includes a top surface, and the limiting wall is located above the top surface in the thickness direction of the camera assembly; and in the width direction of the camera assembly, the limiting wall extends out in a direction of the first body and is staggered with the connecting wall.

The camera assembly according to this application can implement the compact arrangement of a plurality of camera modules, which is conducive to utilization of an internal space of the mobile terminal.

BRIEF DESCRIPTION OF THE DRAWINGS

To describe technical solutions in embodiments or the background of this application more clearly, the following describes accompanying drawings required in embodiments or the background of this application.

DETAILED DESCRIPTION OF ILLUSTRATIVE EMBODIMENTS

Figure 1:
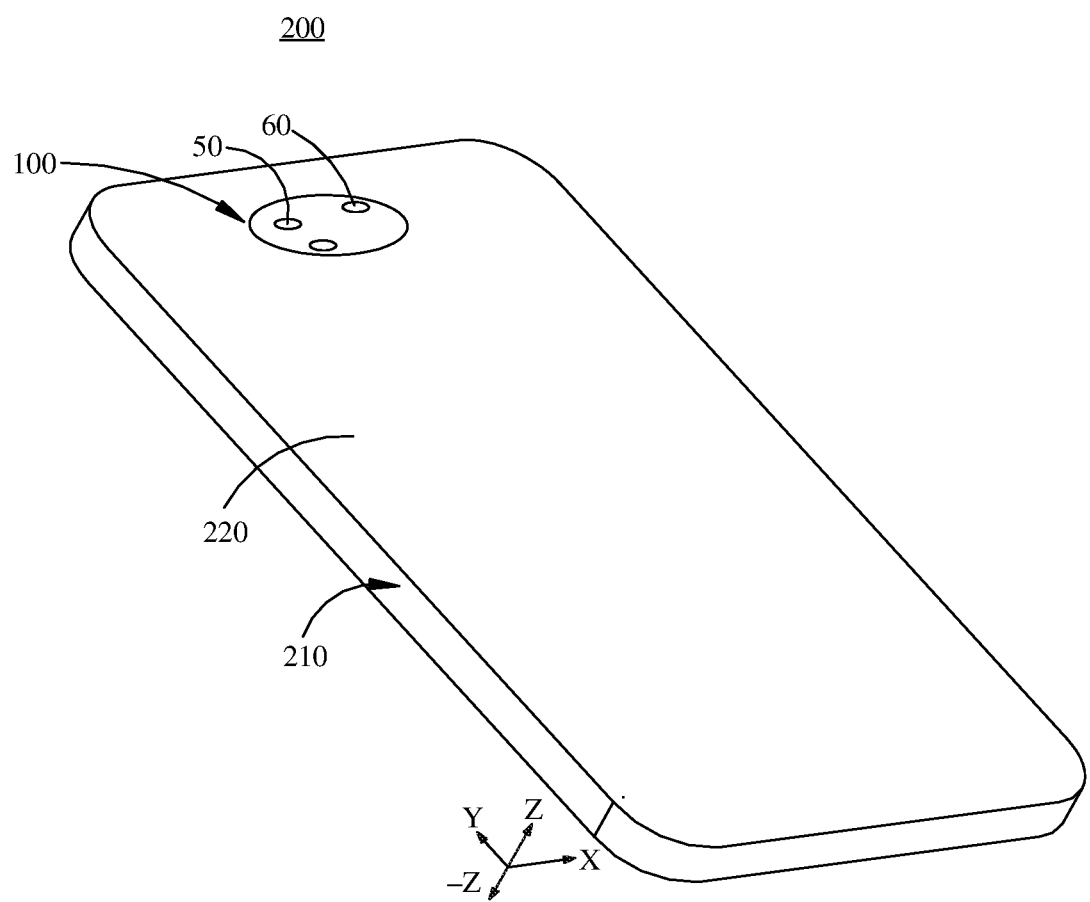
FIG. 1 is a schematic diagram of a mobile terminal according to an embodiment of this application.
Figure 2:
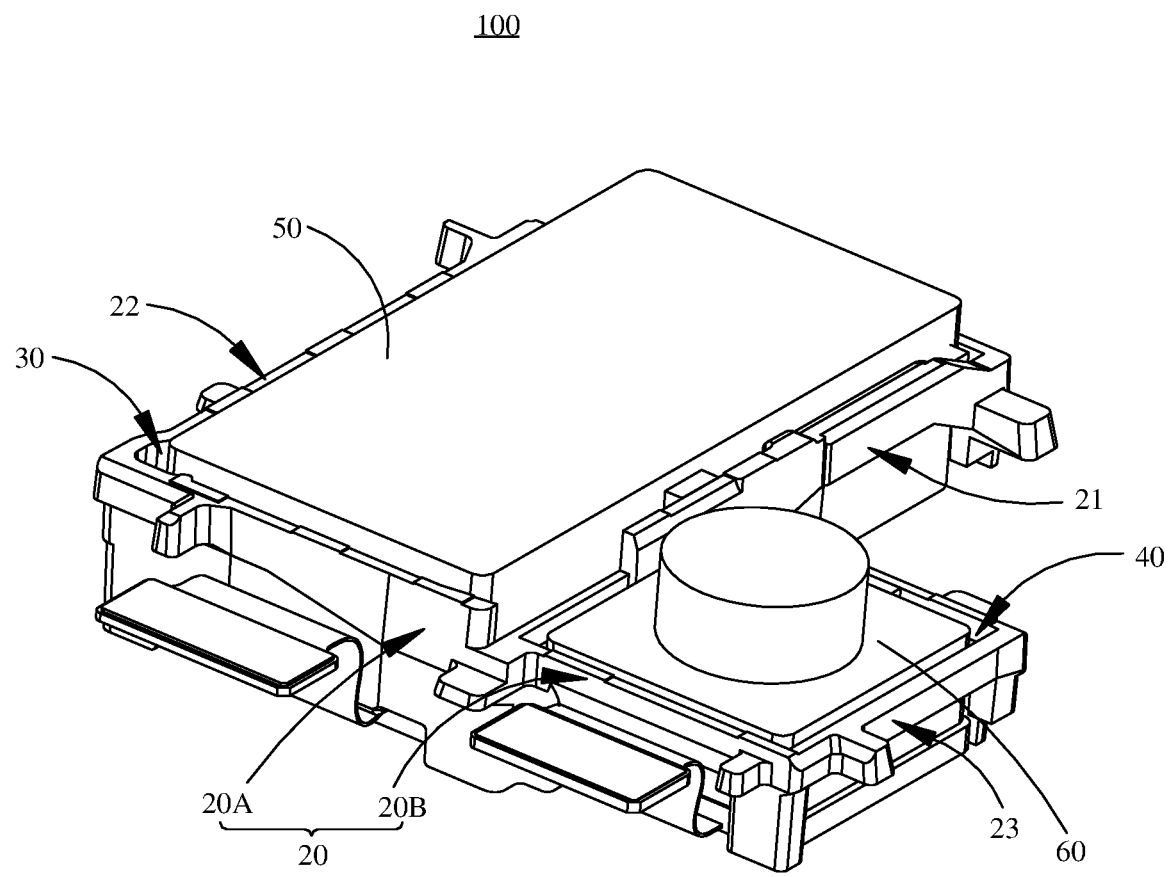
FIG. 2 is a schematic diagram of a structure of a camera assembly according to a first embodiment of this application.

Referring to FIG. 1 and FIG. 2, FIG. 1 is a schematic diagram of a structure of a mobile terminal 200 according to an embodiment of this application, which shows a back of the mobile terminal 200. The mobile terminal 200 may be an electronic product with a photographing function such as a mobile phone or a tablet computer. In this embodiment of this application, an example in which the mobile terminal 200 is a mobile phone is used for description.

The mobile terminal 200 includes a body 210 and a camera assembly 100 mounted on the body 210. The body 210 includes a rear housing 220 and a frame (not shown in the figure), and a middle frame is arranged in the body 210 for carrying the camera assembly 100. The rear housing 220 is provided with a window for exposing a lens of the camera module out of the mobile terminal as a rear camera of the terminal. Certainly, the camera assembly 100 may alternatively be located, as a front camera, on a side that is of the body and on which a display is arranged. The camera assembly 100 includes two or more camera modules. In this embodiment, an example in which the camera assembly 100 includes two camera modules is used for description. The two camera modules are a first camera module 50 and a second camera module 60. The first camera module 50 and the second camera module 60 may have a same function or different functions. For example, the first camera module 50 is a main camera, and the second camera module 60 is an auxiliary camera, which may be a depth-of-field camera, a telephoto/wide-angle camera, a black and white camera, or the like. It should be noted that the two cameras are only one embodiment, and three or more cameras may be provided, and the cameras may be arranged side by side or enclose into a ring.

For ease of description, a width direction of the camera assembly 100 is defined as an X-axis direction, that is, an arrangement direction of the first camera module 50 and the second camera module 60 or a width direction of the mobile terminal 200. A length direction of the camera assembly 100 is a Y-axis direction, and a thickness direction of the camera assembly 100 is a Z-axis direction (including a positive direction of the Z-axis and a negative direction of the Z-axis), and may be a thickness direction of the mobile terminal 200. The X-axis direction, the Y-axis direction, and the Z-axis direction are perpendicular to each other.

Figure 3:
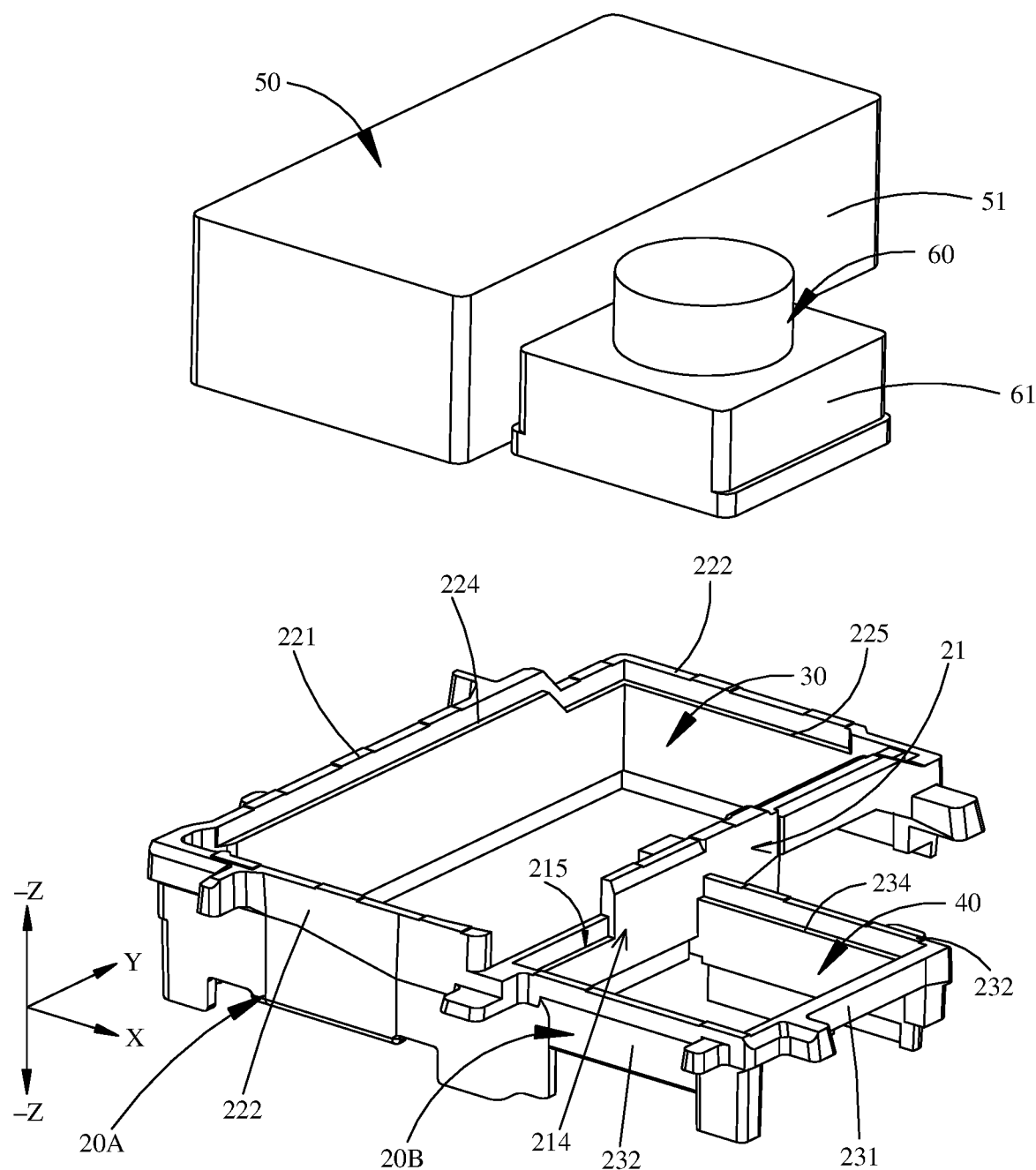
FIG. 3 is a schematic exploded view of a structure of camera modules and a camera support of the camera assembly shown in FIG. 2.

FIG. 2 is a schematic diagram of a structure of a camera assembly according to a first embodiment of this application. FIG. 3 is a schematic exploded view of a structure of camera modules and a camera support of the camera assembly 100 shown in FIG. 2. The camera assembly 100 includes a camera support 20, a first camera module 50, and a second camera module 60. The first camera module 50 includes a first body 51 and a lens (not shown in the figure). The lens is mounted on the first body 51, and the first body 51 includes structures for implementing a photographing function of a camera module, such as an external carrier, a driving motor and a chip located on the carrier. The first camera module 50 is further connected to a flexible circuit board that is located at the bottom of the first body 51 and that is configured to electrically connect a mainboard of the mobile phone. The second camera module 60 includes a second body 61 and a lens. The lens is mounted on the second body 61, and the second body 61 includes structures for implementing a photographing function of a camera module, such as an external carrier, a driving motor located on the carrier, and a chip. The second camera module 60 is further connected to a flexible circuit board that is located at the bottom of the second body 61 and that is configured to electrically connect the mainboard of the mobile phone. The first body 51 and the second body 61 in this embodiment have rectangular contours.

In this embodiment, the camera support 20 is configured to accommodate two camera modules and be fastened to the two camera modules, the camera support 20 includes a first body 20A and a second body 20B connected to the first body 20A, the first body 20A includes a first accommodating space 30, and the second body 20B includes a second accommodating space 40; and the first accommodating space 30 and the second accommodating space 40 are separated by a spacing section of the first body. The first camera module 50 and the second camera module 60 are mounted in the first accommodating space 30 and the second accommodating space 40 respectively and are fixedly connected to each other by using an adhesive. The camera support 20 is made of plastic and integrally formed, which can simplify a process for machining the camera support 20. Certainly, the camera support 20 may be made of a metal provided that usability of the camera module and the terminal is not affected.

The first body 20A includes a partition wall 21 and a first side wall 22, and the second body 20B includes a second side wall 23. The partition wall 21, the first side wall 22, and the second side wall 23 are all strip-shaped plates. The first side wall 22 is connected to the partition wall 21 to enclose the first accommodating space 30, the second side wall 23 is connected to the partition wall 21 to enclose the second accommodating space 40, and the first side wall 22 and the second side wall 23 are located on two opposite sides of the partition wall 21. The first body 20A and the second body 20B may have a same thickness and different thicknesses, that is, the first side wall 22 and the second side wall 23 may have a same width or different widths. In this embodiment, a side of the first side wall 22, a side of the partition wall 21, and a side of the second side wall 23 that face away from the lens of the camera module are flush, that is, corresponding sides of the bottoms of the two camera modules are flush, and an outer contour of the entire camera module is relatively regular, which facilitates assembly with the mobile phone without occupying an excessive space.

Figure 4:
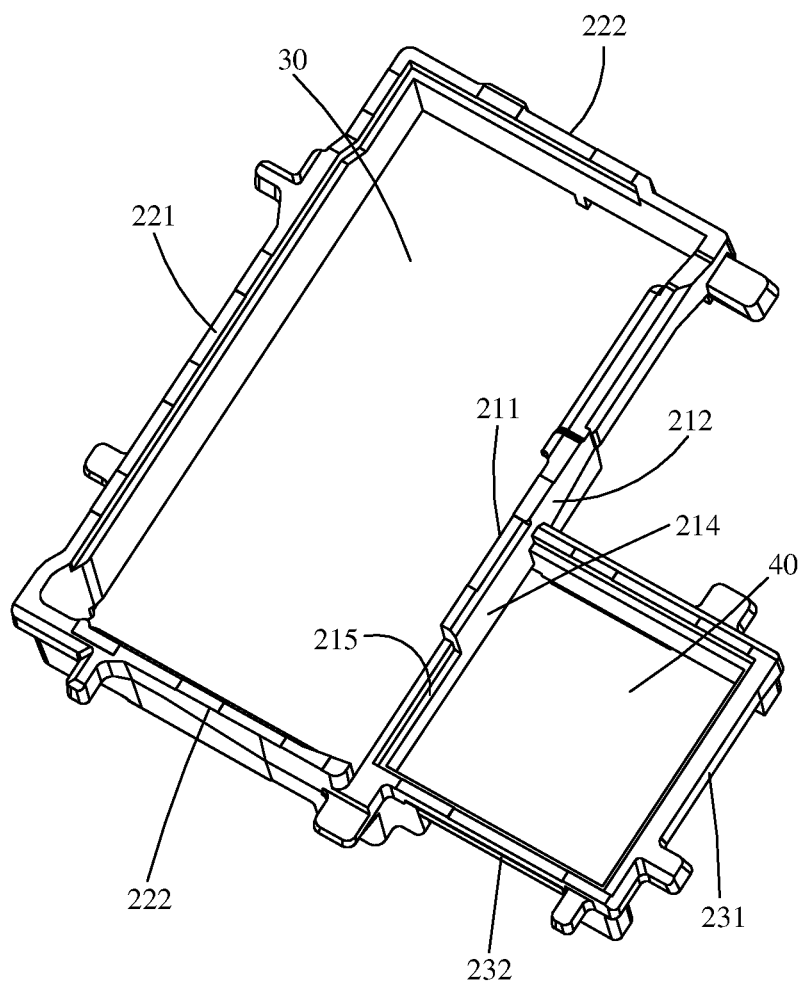
FIG. 4 is a schematic diagram of a structure of the camera support shown in FIG. 3.

Referring to FIG. 3 and FIG. 4, FIG. 4 is a schematic diagram of a structure of the camera support shown in FIG. 3. A partition wall 21 is a rectangular thin plate, and the partition wall 21 includes a first surface 211 and a second surface 212 facing away from the first surface 211. The first side wall 22 has a substantially U-shaped structure, the first side wall 22 includes a first sub-side wall 221 and two first sub-end walls 222 opposite to each other, and the two first sub-end walls 222 are connected to two opposite ends of the first sub-side wall 221 respectively. The first side wall 22 is located on the first surface 211 of the partition wall 21, and end portions that are of the two first sub-end walls 222 and that are far away from the first sub-side wall 221 are connected to two opposite ends of the first surface 211. The first sub-side wall 221 is opposite to the partition wall 21. The first sub-side wall 221, the two first sub-end walls 222, and the partition wall 21 enclose the first accommodating space 30. The first sub-side wall 221 has the same length as the partition wall 21. The first accommodating space 30 in this embodiment is rectangular, and it can be understood that the first side wall 22 and the partition wall 21 are side walls of the first accommodating space 30.

In this embodiment, the second side wall 23 has a substantially U-shaped structure, the second side wall 23 includes a second sub-side wall 231 and two second sub-end walls 232 opposite to each other, and the two second sub-end walls 232 are connected to two opposite ends of the second sub-side wall 231 respectively. The second side wall 23 is located on the second surface 212 of the partition wall 21, and end portions that are of the two second sub-end walls 232 and that are far away from the second sub-side wall 231 are connected to the second surface 212. The second sub-side wall 231 is opposite to the partition wall 21. The second sub-side wall 231, the second sub-end walls 232, and part of the partition wall 21 enclose the second accommodating space 40. The second accommodating space 40 in this embodiment is rectangular. It can be understood that the second side wall 23 and part of the partition wall 21 are side walls of the second accommodating space 40. An end of one second sub-end wall 232 is connected to an end of the second surface 212, and an end of the other second sub-end wall 232 is connected to the second surface 212, that is, the second sub-side wall 231 has a length less than that of the partition wall 21. It can be understood that the second accommodating space 40 has a length and/or a width less than a length and/or a width of the first accommodating space 30. This design is set based on the sizes of the two camera modules. If the two camera modules are of a same size, overall sizes of the first accommodating space 30 and the second accommodating space 40 are also the same.

In this embodiment, the first accommodating space 30 and the second accommodating space 40 share part of the partition wall 21, and the partition wall 21 separates the first accommodating space 30 from the second accommodating space 40. A part of the partition wall 21 as the side wall of the second accommodating space 40 is a spacing section 214. The spacing section 214 is provided with an adhesive groove 215 facing the second accommodating space 40, and the adhesive groove 215 is formed by recessing the second surface 212 of the spacing section 214 toward the inside of the spacing section 214, that is, recessing in a direction of the first accommodating space 30. The adhesive groove 215 in this embodiment is a strip-shaped open groove with an L-shaped cross-section; and the adhesive groove 215 extends in a length direction of the spacing section 214, and runs through a side surface (not shown in the figure) of the spacing section 214 in a width direction of the partition wall 21, and the side surface connects the first side surface 211 to the second side surface 212.

Figure 5:
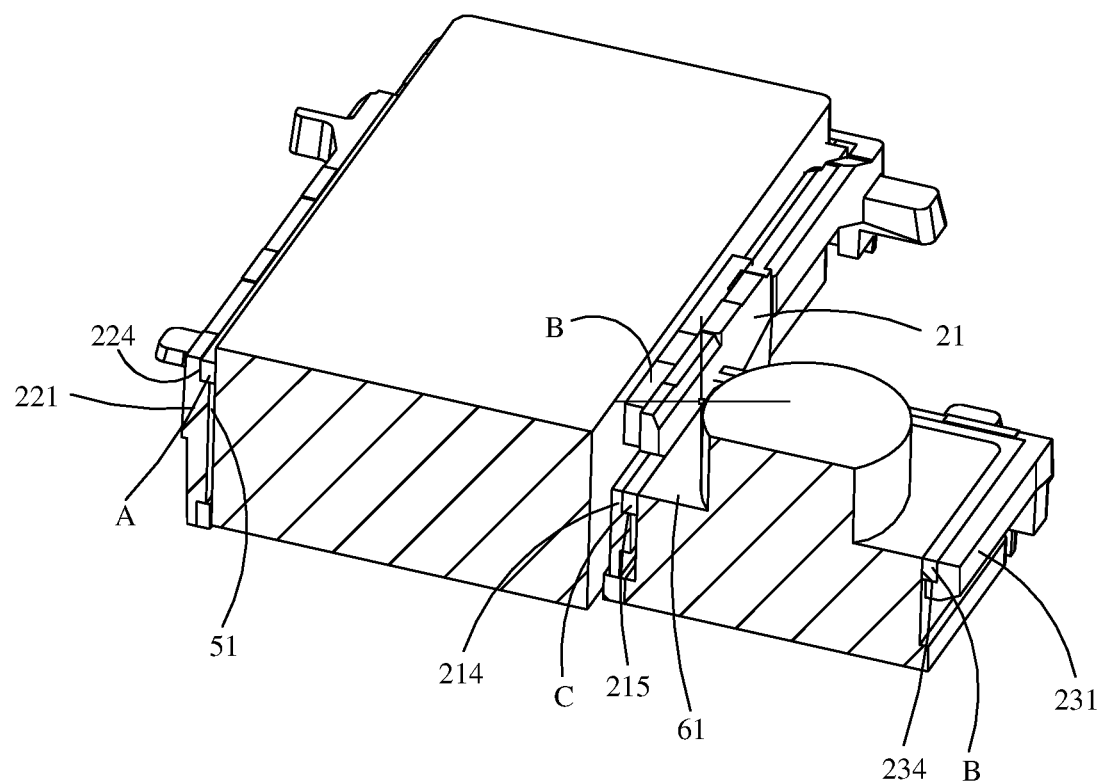
FIG. 5 is a schematic sectional view of the camera assembly shown in FIG. 2 with an adhesive.

As shown in FIG. 3 and FIG. 5, FIG. 5 is a schematic sectional view of the camera assembly shown in FIG. 2 with an adhesive. In this embodiment, an adhesive groove 224 is recessed in a surface that is of the first sub-side wall 221 and that faces the first accommodating space 30. The adhesive groove 224 is located at an edge of the first sub-side wall 221 in the positive direction of the Z-axis, and runs through a side surface in the positive direction of the Z-axis. Adhesive grooves 225 are recessed in surfaces that are of the two first sub-end walls 222 and that face the first accommodating space 30, and the adhesive grooves 225 are located at edges of the first sub-end walls 222 in the positive direction of the Z-axis, and run through a side surface in the positive direction of the Z-axis. The Z-axis direction is also a width direction of the first sub-side wall 221 and the thickness direction of the camera assembly. The adhesive grooves 225 and the adhesive groove 224 are flush in the Z-axis direction and connected to each other to form a first adhesive groove.

Specifically, the adhesive grooves 225 and the adhesive groove 224 each have an L-shaped cross-section, the adhesive grooves 225 and the adhesive groove 224 are each configured to accommodate an adhesive tape A (as shown in FIG. 5), and the adhesive tape A directly connects an outer surface of the first body 51 of the first camera module 50 to a groove wall of the first adhesive groove, so that there is no need to reserve a dispensing slit between the first body 51 of the first camera module 50 and the first accommodating space 30, thereby reducing lengths and widths of the camera support and the camera assembly. In addition, the cross-section of the first adhesive groove is L-shaped, so that an adhesive can be easily dispensed in the first adhesive groove after the camera module is mounted on the camera support 20.

In an implementation, the first camera module 50 is mounted in the first accommodating space 30, and there is a slit between an outer peripheral surface of the first body 51 and a surface of the side wall of the first accommodating space 30. An adhesive is dispensed in the slit and cured to form an adhesive tape, and the adhesive tape bonds the first body 51 to the first accommodating space 30, thereby fastening the first camera module 50 in the camera support 20. Specifically, the first accommodating space 30 is bonded and fastened, by using adhesive tapes, to a surface of the first side wall 22 facing the first body 51 and the first surface 211 of the partition wall.

As shown in FIG. 3 and FIG. 5, in this embodiment, a surface that is of the second side wall 23 and that faces the first accommodating space 30 is provided with a second adhesive groove 234. The adhesive groove 234 is located at an edge of the second sub-side wall 231 in the positive direction of the Z-axis, the second adhesive groove 234 extends to wall surfaces that are of the two second sub-end walls 232 and that face the second accommodating space 40, and the second adhesive groove 234 is located at edges of the second sub-end walls 232 in the positive direction of the Z-axis. Specifically, the second adhesive groove 234 has an L-shaped cross-section, the second adhesive groove 234 is configured to accommodate an adhesive tape B, and the adhesive tape B is directly connected between an outer surface of the second body 61 of the second camera module 60 and a groove wall of the second adhesive groove 234, so that there is no need to reserve a dispensing slit between the second body 61 of the second camera module 60 and a groove side wall of the second accommodating space 40, thereby reducing the length and width of the camera support 20. The cross-section of the second adhesive groove 234 is L-shaped, so that an adhesive can be easily dispensed in the second adhesive groove after the second camera module 60 is mounted on the camera support 20.

A surface that is of the spacing section 214 as a side wall of the second accommodating space 40 and that is provided with the adhesive groove 215 faces the second body 61, an adhesive tape C is formed in the adhesive groove 215, and the adhesive tape C bonds a wall surface 2151 of the adhesive groove 215 to part of an outer surface of the second body 61. The second camera module 60 is fixedly connected to the second accommodating space 40 by using the adhesive tape B and the adhesive tape C, and the second surface 212 is in direct contact with the outer surface of the second body 61. In this way, the space in the thickness direction of the spacing section 214 is not occupied, and the distance between the first camera module 50 and the second camera module 60 is reduced.

In another implementation, the second camera module 60 is mounted in the second accommodating space 40, and there is a slit (not shown in the figure) between an outer peripheral surface of the second body 61 and a surface of part of the side wall of the second accommodating space 40. An adhesive is dispensed in the slit and cured to form an adhesive tape. Specifically, surfaces that are of the second sub-side wall 231 and the two second sub-end walls 232 of the second side wall 23 and that face the second body 61 are bonded and fastened to part of the outer surface of the second body 61 by using adhesive tapes.

In an implementation, an edge of a side of the side wall of the first accommodating space 30 in the negative direction of the Z-axis is provided with an adhesive groove, and the adhesive groove is used for dispensing an adhesive to form an adhesive tape, so as to fasten the first body 51 of the first camera module 50. Through the opposite arrangement of the adhesive groove and the first adhesive groove in the thickness direction of the camera support, the first camera module 50 can be more stably fastened to the camera support 20. An edge of a side of the side wall of the second accommodating space 40 in the negative direction of the Z-axis is provided with an adhesive groove, and the adhesive groove is used for dispensing an adhesive to form an adhesive tape, so as to fasten the first body 51 of the second camera module 60. Through the opposite arrangement of the adhesive groove and the second adhesive groove in the thickness direction of the camera support, the second camera module 60 can be more stably fastened to the camera support 20, thereby ensuring stability of assembling the first camera module 50 and the second camera module 60 to the camera support 20.

In this application, in the arrangement direction of the first camera module 50 and the second camera module 60, the distance between the first camera module 50 and the second camera module 60 is the thickness of the spacing section 214, and the adhesive tape C for fastening the second camera module 60 does not occupy the space in the arrangement direction of the first camera module 50 and the second camera module 60, thereby reducing the distance between the first camera module 50 and the second camera module 60. The camera assembly according to this embodiment implements compact arrangement of a plurality of groups of cameras, and the size of the camera support is reduced, thereby reducing a size of the camera assembly, preventing the camera assembly from occupying an excessive space of the terminal, and conforming to an existing space utilization design of the terminal.

Figure 6:
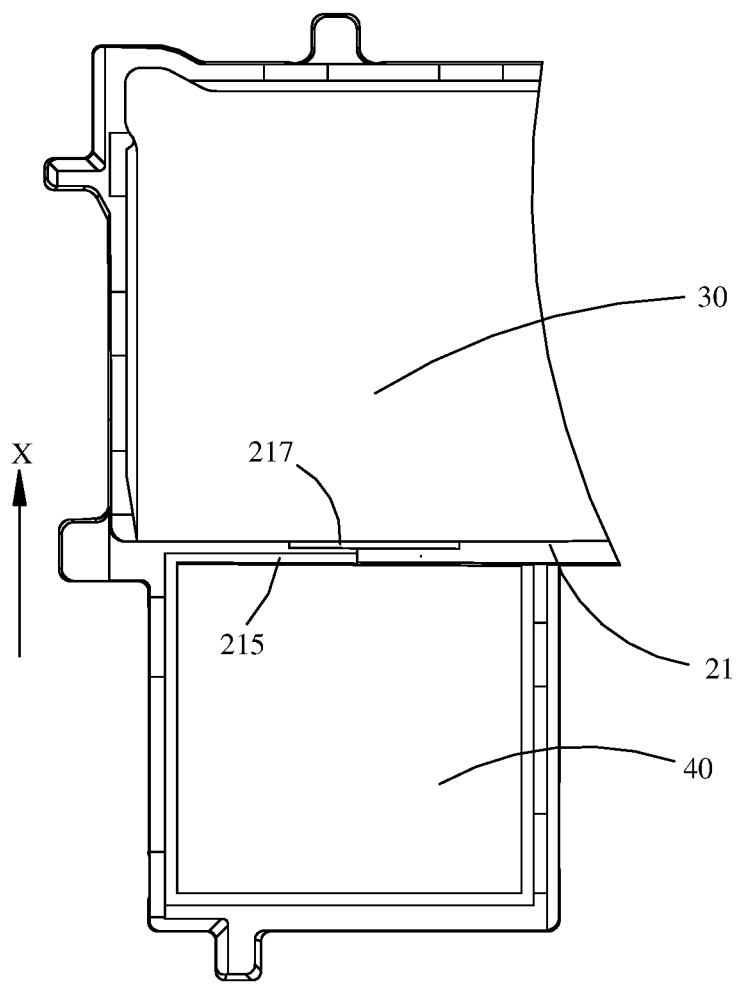
FIG. 6 is a schematic plan view of an implementation of the camera support shown in FIG. 2.

FIG. 6 is a schematic plan view of an implementation of the camera support shown in FIG. 2. In this implementation, based on the foregoing embodiment, the first surface 211 that is of the partition wall 21 and that is located in the first accommodating space 30 is provided with a groove 217, and the groove 217 is formed by recessing the first surface 211 of the partition wall 21 toward the inside of the partition wall 21. The groove 217 in this embodiment is an open groove with an L-shaped cross-section; and the groove 217 extends in a length direction of the partition wall 21, and runs through a side surface of the partition wall 21 in a width direction. The first camera module 50 is mounted in the first accommodating space 30, the first body 51 is in contact with the first surface 211, and an adhesive tape formed in the groove is connected to the outer surface of the first body 51, so that the partition wall 21 is bonded and fastened to the first body 51. In the X-axis direction, that is, in the arrangement direction of the first accommodating space 30 and the second accommodating space 40, the groove 217 and the adhesive groove 215 are completely staggered or at least partially overlap, so that the first camera module 50 and the second camera module 60 have a smaller distance therebetween and are more compact, and the size of the camera support in the X-axis direction is reduced. The groove 217 and the adhesive groove 215 are completely staggered, which can further ensure a strength of the partition wall 21. The groove 217 and the adhesive groove 215 in FIG. 6 partially overlap, and a part that is of the partition wall 21 and that is not provided with the groove 217 and the adhesive groove 215 can ensure the strength of the partition wall 21 without affecting an overall strength of the camera support 20.

Figure 7:
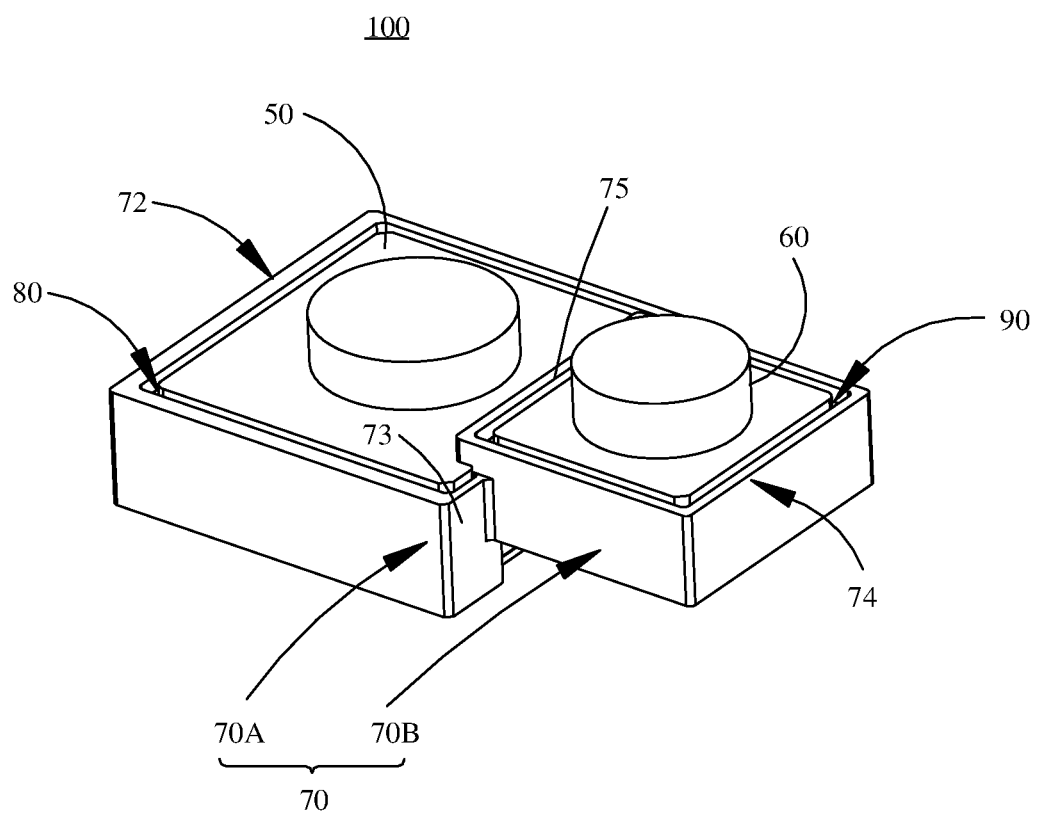
FIG. 7 is a schematic diagram of a structure of a camera assembly according to a second embodiment of this application.
Figure 8:
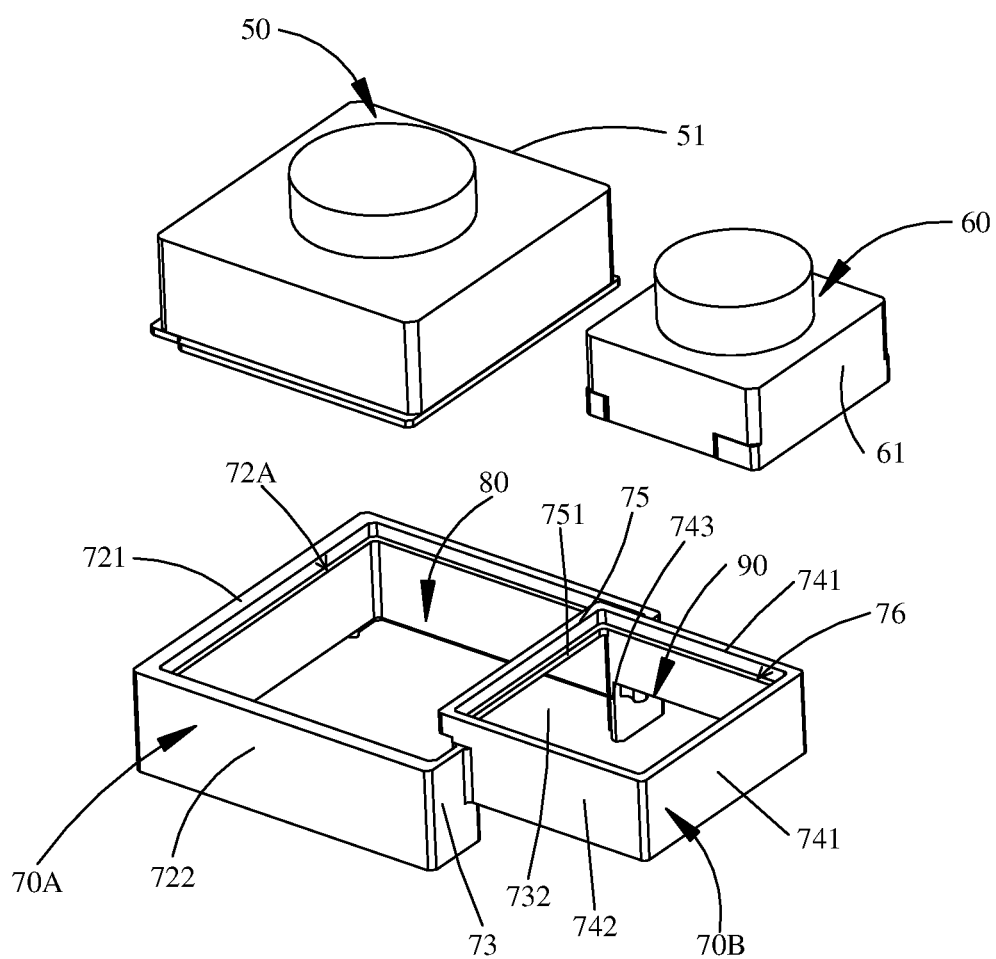
FIG. 8 is a schematic exploded view of a structure of the camera assembly shown in FIG. 7.

FIG. 7 is a schematic diagram of a structure of a camera assembly according to a second embodiment of this application. FIG. 8 is a schematic exploded view of a structure of the camera assembly 100 provided in FIG. 7. A camera support 70 in this embodiment includes a first body 70A and a second body 70B connected to the first body 70A, the first body 70A includes a first accommodating space 80, and the second body 70B includes a second accommodating space 90; and a first camera module 50 and a second camera module 60 are mounted in the first accommodating space 80 and the second accommodating space 90 respectively and fixedly connected to each other by using an adhesive. The camera support 70 is made of plastic and integrally formed, which can simplify a process for machining the camera support 70. Certainly, the camera support 70 may be made of a metal provided that usability of the camera module and the terminal is not affected. In the Z-axis direction, a thickness of the first body 70A in this embodiment is greater than that of the second body 70B.

The first body 70A includes a first side wall 72 and a connecting wall 73; and the second body 70B includes a second side wall 74 and a limiting wall 75. The first side wall 72, the connecting wall 73, and the second side wall 74 are all strip-shaped thin plates. The first side wall 72 and the connecting wall 73 enclose the first accommodating space 80. The limiting wall of that second side wall 74 forms the second accommodating space 90; and the second side wall 74 is connected to the connecting wall 73, and the first accommodating space 80 and the second accommodating space 90 are arranged side by side and communicate with each other. The limiting wall 75 is configured to position the second camera module 60 together with the second side wall 74, and is bonded and fastened to the second camera module by using an adhesive, to ensure stability in fastening the second camera module.

Figure 9:
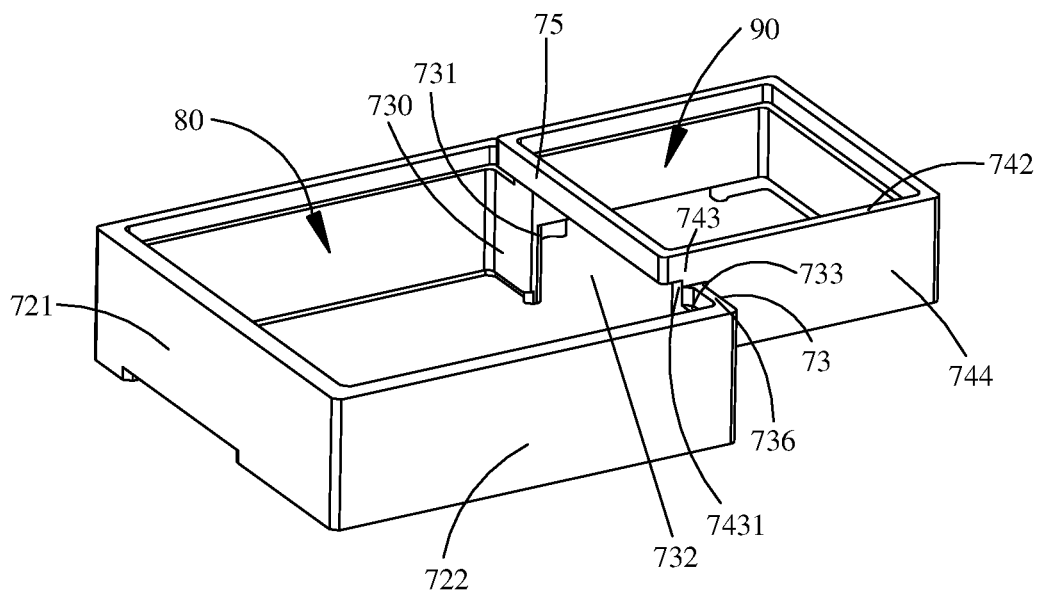
FIG. 9 is a schematic diagram of a structure of a camera support of the camera assembly shown in FIG. 8 in a perspective.

FIG. 9 is a schematic diagram of a structure of a camera support of the camera assembly shown in FIG. 8 in a perspective. The first side wall 72 is a thin plate with a substantially U-shaped structure, the first side wall 72 includes a first sub-side wall 721 and two first sub-end walls 722 opposite to each other, and one end of one sub-end wall 722 and one end of the other sub-end wall 722 are connected to two opposite ends of the first sub-side wall 721, respectively. The connecting wall 73 is parallel and opposite to the first sub-side wall 721. One end of one sub-end wall 722 and one end of the other sub-end wall 722 that are far from the first sub-side wall 721 are connected to two opposite ends of the connecting wall 73, respectively, that is, two opposite ends of each first sub-end wall 722 are connected to the first sub-side wall 721 and the connecting wall 73 respectively, so that the first side wall 72 and the connecting wall 73 enclose the first accommodating space 80. The connecting wall 73 is provided with a through groove 732 that communicates with the first accommodating space. A surface that is of the connecting wall 73 and that faces the first sub-side wall is a wall surface 730.

Specifically, the through groove 732 runs through the connecting wall 73 and divides the connecting wall into two parts, the two parts are two opposite side walls 731 of the through groove 732, surfaces of the two side walls 731 are spaced opposite to each other in the Y-axis direction, and a width of the two side walls 731 (a depth of the through groove 732 in the X-axis direction) is a thickness of the connecting wall 73. The first accommodating space 80 in this embodiment is rectangular, and the two first sub-end walls 722, the first sub-side wall 721, and the connecting wall 73 have a same width, and may be understood as the side walls of the first accommodating space 80.

Figure 10:
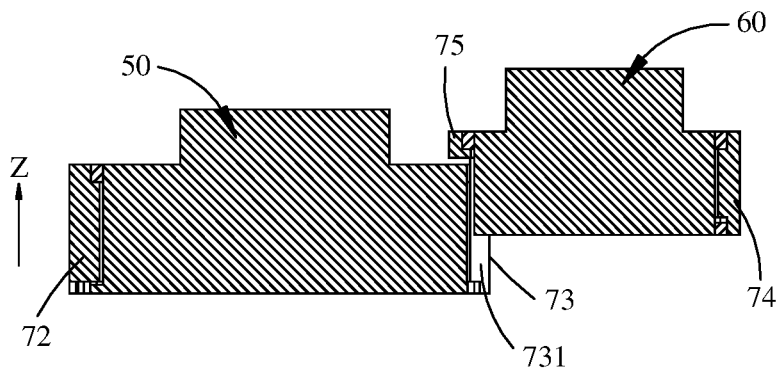
FIG. 10 is a schematic sectional view of the camera assembly shown in FIG. 7 in a perspective.

FIG. 10 is a schematic sectional view of the camera assembly shown in FIG. 7 in a perspective. A second side wall 74 has a substantially U-shaped structure, the second side wall 74 includes a second sub-side wall 741 and two second sub-end walls 742 parallel and opposite to each other, and the two second sub-end walls 742 are connected to two opposite ends of the second sub-side wall 741 respectively. The second sub-side wall 741 and the two second sub-end walls 742 enclose a second accommodating space 90, and the second accommodating space 90 is rectangular with an opening. Specifically, an end that is of each of the two second sub-end walls 742 and that is far away from the second sub-side wall 741 is a free end 743, the free end 743 includes an end face 7431 facing away from the second sub-side wall 741, and surfaces that are of the two second sub-end walls 742 and that face away from each other are outer surfaces 744. An opening is formed between the two free ends 743, and the opening communicates with the second accommodating space 90.

The end faces 7431 of the two free ends 743 each include a top area, the limiting wall 75 is a strip-shaped plate, and a width of the limiting wall 75 is less than that of the second side wall 74. Two opposite ends of the limiting wall 75 are connected to the top areas of the end faces of the free ends 743 of the two second sub-end walls 742 respectively, and are parallel to the second sub-side wall 741. It can be understood that the limiting wall 75 closes the opening part. Actually, the second side wall 74 is integrally formed with the limiting wall 75. It can be understood that the second side wall 74 and the limiting wall 75 are side walls of the second accommodating space 90.

In the width direction of the camera assembly, that is, the X-axis direction, two free ends of the second side wall, that is, the two free ends 743 of the two second sub-end walls 742, extend into the through groove 732. Outer side surfaces 744 of the two free ends are connected to the surfaces of the side walls 731 of the through groove 732, and part of the through groove 732 coincides with the opening. It can be understood that the part of the second sub-end wall 742 extending into the through groove 732 is a part of the connecting wall 73. The first camera module 50 is accommodated in the first accommodating space 80, the second camera module 60 is accommodated in the second accommodating space 90, a gap is formed between the second camera module 60 and the first camera module 50, and the gap is located at the through groove, that is, at the opening.

The connecting wall 73 includes a top surface 736, and the limiting wall 75 is located above the top surface 736 in the thickness direction of the camera assembly 100. In the width direction of the camera assembly 100, the limiting wall 75 extends out in a direction of the first body 70A and is staggered with the connecting wall 73. The limiting wall 75 includes a wall surface 751 facing the second accommo-dating space 90. In the width direction of the camera assembly 100, the limiting wall 75 is staggered with the connecting wall 73, and the wall surface 751 of the limiting wall 75 faces away from the wall surface 730 of the connecting wall 73.

Specifically, it can be learned from FIG. 10 that the second side wall 74 protrudes from the first side wall 72 and the connecting wall 73 in the positive direction of the Z-axis, and a projection of the limiting wall 75 in the positive direction of the Z-axis is located in the first accommodating space 80, that is, the limiting wall 75 extends out from above the connecting wall 73 in the direction of the first accommodating space 80 (in the positive direction of the Z-axis). It can be understood that an overall height of the second body 70B is greater than that of the first body 70A in the positive direction of the Z-axis, and the overall height of the second body is less than that of the first body in the negative direction of the Z-axis.

The first camera module 50 is mounted in the first accommodating space 80, the second body 61 is located below the limiting wall 75, the second camera module 60 is mounted in the second accommodating space 90, the second body 61 is partially located in the through groove 732, and a gap is formed between the second body 61 and the first camera module 80. The limiting wall 75 can position the second camera module without occupying the space in the width direction of the camera assembly, which does not increase the distance between the first camera module 50 and the second camera module 60. Further, the gap may be filled with an insulating adhesive to further fasten the first camera module 50 to the second camera module 60.

In an embodiment, the wall surface 751 that is of the limiting wall 75 and that faces the second accommodating space 90 is flush, in the Z-axis direction, with the wall surface 730 that is of the connecting wall 73 and that faces the first accommodating space 80, that is, the space where the through groove is located completely overlaps the opening of the second body, the size of the second accommodating space 90 in the X-axis direction is greater than that of the second camera module 60 in the X-axis direction, and the second camera module 60 is mounted in the second accommodating space 90; a side of the second body 61 is connected to the second sub-side wall 741, and the other side of the second camera module 60 is located at the opening, and a gap is formed between the other side of the second camera module 60 and the first accommodating space. The gap separates the first camera module 50 from the second camera module 60, thereby preventing the first camera module 50 from being in direct contact with the second camera module 60. In this embodiment, the end faces 7431 of the free ends are flush with the wall surface 730.

Figure 11:
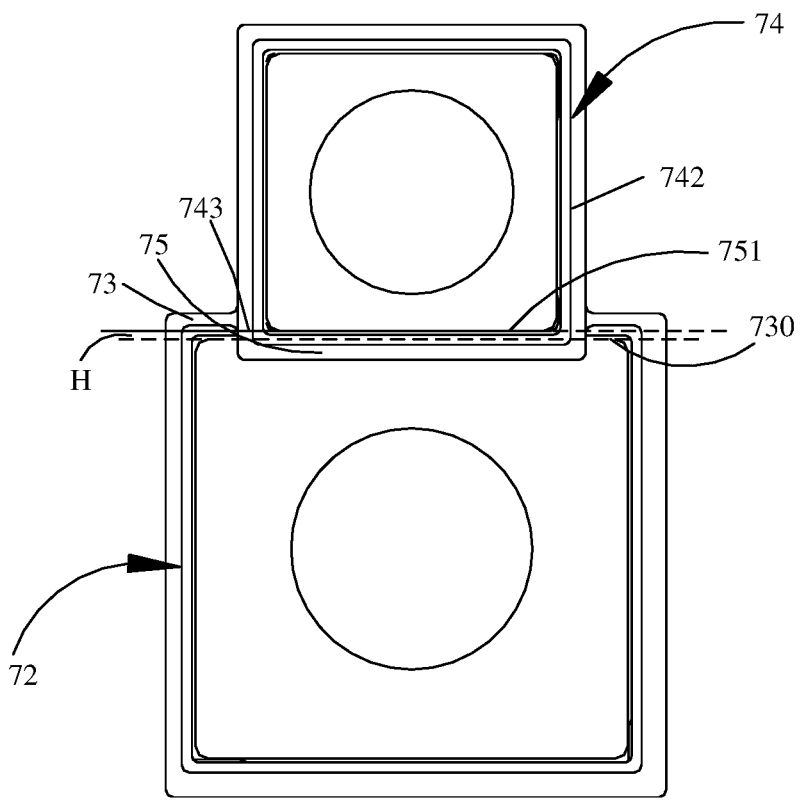
FIG. 11 is a schematic plan view of a structure of an embodiment of the camera support shown in FIG. 9.

FIG. 11 is a schematic plan view of a structure of an embodiment of the camera support shown in FIG. 9. In an embodiment, a wall surface 751 that is of the limiting wall 75 and that faces the second accommodating space 90 is partially staggered, in the X-axis direction, with the wall surface 730 that is of the connecting wall 73 and that faces the first accommodating space 80, that is, a projection of the limiting wall 75 on the Z-axis covers part of the through groove 732, or covers part of the opening; the second camera module 60 is mounted in the second accommodating space 90, and a side that is of the second camera module 60 and that is far away from the second side wall is abutted against and limited by the wall surface 751 of the limiting wall 75, so as to prevent the second camera module 60 from entering the first accommodating space 80 through the through groove and the opening, and ensure that a gap H is formed between the first camera module 50 and the second camera module 60.

It can be understood that the gap H coincides with part of the opening, a part of a projection of the limiting wall 75 on the Z-axis covers part of the through groove 732, and the other part is located in the first accommodating space 80, that is, the limiting wall 75 is staggered in the direction of the first accommodating space 80 relative to the connecting wall 73, and the distance between the wall surfaces 751 and 730 is a width of the gap H. After the second camera module 60 is mounted in the second accommodating space 90, the gap H is directly formed at the opening without manual arrangement during assembly, making the assembly convenient. The gap H is located between the wall surface 730 that is of the connecting wall 73 and that faces the first accommodating space 80 and the wall surface 751 facing away from the first accommodating space 80.

In an embodiment, a limiting wall 75 is arranged at the opening between the two second sub-end walls 742, the limiting wall 75 is connected to connecting walls 73 on two sides of the through groove, and projections of the limiting walls are located in the through groove 732. A thickness of the limiting wall 75 is less than that of the connecting wall 73, the limiting wall 75 is located between the first camera module 50 and the second camera module 60, and the distance between the first camera module 50 and the second camera module 60 is the thickness of the limiting wall 75. An adhesive groove is recessed in a surface of the limiting wall without occupying the space in the X-axis direction.

In this embodiment, the two second sub-end walls 742 extend into the through groove of the connecting wall 73, that is, the groove side wall of the first accommodating space 80, and the limiting wall 75 partially overlaps the first accommodating space 80. This is equivalent to the following case: The side wall of the first accommodating space 80 and the side wall of the second accommodating space 90 are embedded in each other, that is, the first body and the second body are embedded in each other. In the X-axis direction, an inner space of the first accommodating space 80 directly communicates with an inner space of the second accommodating space 90 without other intervals, so that the first camera module 50 and the second camera module 60 are arranged more compactly in the X-axis direction. After the second camera module 60 is mounted in the second accommodating space 90, the distance between the second camera module 60 and the first camera module 50 in the first accommodating space 80 is less than the thickness of the connecting wall between the first accommodating space 80 and the second accommodating space 90, provided that a mounting strength between the first camera module 50 and the second camera module 60 is ensured. Further, the first camera module 50 and the second camera module 60 do not need a space for providing an adhesive layer in the X-axis direction, and the second accommodating space 90 uses the through groove of the groove side wall of the first accommodating space as part of the space. The distance between the first camera module 50 and the second camera module 60 is only a width of a slit between the first camera module 50 and the second camera module 60, thereby reducing the distance between the first camera module 50 and the second camera module 60, and further reducing an inner space of a mobile phone occupied by the camera support 20.

Figure 12:
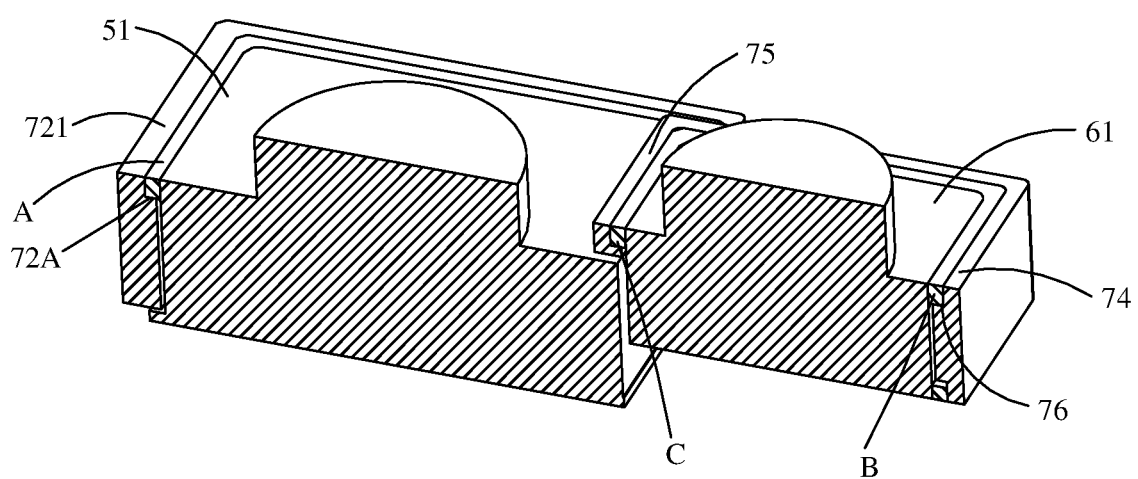
FIG. 12 is a schematic sectional view of the camera assembly shown in FIG. 7 in a perspective.

FIG. 12 is a schematic sectional view of the camera assembly shown in FIG. 7 in a perspective. In this embodiment, surfaces that are of the first sub-side wall 721 and the two first sub-end walls 722 and that face the first accommodating space 80 are provided with second adhesive grooves 72A. The second adhesive grooves 72A extend to the wall surface of the connecting wall 73. The second adhesive grooves 72A are located at an edge of the connecting wall 73 in the positive direction of the Z-axis. It can be understood that peripheries of inner surfaces of the side walls of the first accommodating space 80 are provided with the second adhesive grooves 72A. The second adhesive groove 72A in this embodiment has an L-shaped cross-section, the second adhesive groove 72A runs through the first sub-side wall 721, the two first sub-end walls 722, and the side surface that is of the connecting wall 73 and that is located in the positive direction of the Z-axis. The second adhesive groove 72A is configured to accommodate an adhesive tape A, and the adhesive tape A is directly connected to the outer surface of the first body 51 of the first camera module 50, so that there is no need to reserve a dispensing slit between the first body 51 of the first camera module 50 and the first accommodating space 80, thereby reducing the length and the width of the camera support.

Surfaces that are of the second side wall 74 and the limiting wall 75 and that face the inside of the second accommodating space 90 are provided with first adhesive grooves 76. The first adhesive grooves 76 are located at edges of the second side wall 74 and the limiting wall 75 in the positive direction of the Z-axis. It can be understood that peripheries of inner surfaces of the side walls of the second accommodating space 90 are provided with the first adhesive grooves. The first adhesive groove has an L-shaped cross-section, the first adhesive groove is configured to accommodate an adhesive tape B, and the adhesive tape B directly connects an outer surface of the second body 61 of the second camera module 60 to the first adhesive groove 76, so that there is no need to reserve a dispensing slit between the second body 61 and a groove side wall of the second accommodating space 90, thereby reducing the length and width of the camera support 20.

In a third embodiment of this application, the camera assembly further includes a third body and a third camera module, where the third body includes a third side wall, the third side wall is connected to the first side wall to enclose a third accommodating space for accommodating the third camera module, a wall surface that is of the first side wall and that is located in the third accommodating space is provided with an adhesive accommodating groove, and an adhesive tape is arranged in the adhesive accommodating groove and is used to bond the third body to the third camera module; or the third side wall is connected to the second side wall to enclose a third accommodating space for accommodating the third camera module, a wall surface that is of the second side wall and that is located in the third accommodating space is provided with an adhesive accommodating groove, and an adhesive tape is arranged in the adhesive accommodating groove and is used to bond the third body to the third camera module. In this embodiment, the mode of spacing the first accommodating space from the second accommodating space in the first embodiment or the mode of spacing the first accommodating space from the second accommodating space in the second embodiment may be adopted, so that the distance between the third camera module and a camera module adjacent thereto can be reduced, and the camera modules are arranged as compactly as possible.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera assembly, comprising:
   a first camera;
   a second camera; and
   a camera support comprising a first body and a second body, wherein the first body defines a first accommodating space, the second body defines a second accommodating space, and the first accommodating space and the second accommodating space are separated by a spacing section;
   wherein a first groove extends in a first surface that is of the spacing section and that faces the first accommodating space, a first adhesive is in the first groove, the first camera is accommodated in the first accommodating space, and the first camera is bonded to the spacing section by the first adhesive;
   wherein a second groove extends in a second surface that is of the spacing section and that faces the second accommodating space, a second adhesive is in the second groove, the second camera is accommodated in the second accommodating space, and the second camera is bonded to the spacing section by the second adhesive; and
   wherein in an arrangement direction of the first accommodating space and the second accommodating space, the first groove is staggered with the second groove.

2. The camera assembly of claim 1, wherein the spacing section comprises a side surface connecting the first surface to the second surface, and the first groove and the second groove run through the side surface.

3. The camera assembly of claim 1, wherein the first body comprises a first side wall and a partition wall, the partition wall comprises the spacing section, and the first side wall and the partition wall define the first accommodating space.

4. The camera assembly claim 3, wherein the first side wall comprises a first sub-side wall and two first sub-end walls, the two first sub-end walls are connected to opposite ends of the first sub-side wall respectively, and the first sub-side wall is opposite to the partition wall; and
   wherein the first sub-side wall, the two first sub-end walls and the partition wall define the first accommodating space.

5. The camera assembly of claim 4, wherein a first adhesive groove is recessed in a surface that is of the first sub-side wall and the two first sub-end walls and that faces the first accommodating space, the first adhesive groove accommodates a third adhesive, and the first camera is bonded in the first adhesive groove by the third adhesive.

6. The camera assembly of claim 5, wherein the first adhesive and the second adhesive and the third adhesive are adhesive tapes.

7. The camera assembly of claim 1, wherein the second body comprises a second side wall and the spacing section, and the second side wall and the spacing section define the second accommodating space.

8. The camera assembly of claim 7, wherein the second side wall comprises a second sub-side wall and two second sub-end walls, the two second sub-end walls are connected to opposite ends of the second sub-side wall respectively, and the second sub-side wall is opposite to a partition wall of the first body; and
   wherein the second sub-side wall, the two second sub-end walls and the partition wall define the second accommodating space.

9. The camera assembly of claim 8, wherein the second groove is recessed in a surface that is of the second sub-side wall and the two second sub-end walls and that faces the second accommodating space, the second groove accommodates a fourth adhesive, and the second camera is bonded in the second groove by the fourth adhesive.

10. The camera assembly of claim 1, wherein the first camera comprises a first camera body and a first lens, and the first lens is mounted on the first camera body; and
    wherein the first camera body comprises a first carrier, a first driving motor and a first chip, and the first driving motor and the first chip are located on the first carrier.

11. The camera assembly of claim 10, wherein the first camera further comprises a first flexible circuit board, and the first flexible circuit board is configured to electrically connect a mainboard of a mobile phone with the camera assembly.

12. The camera assembly of claim 1, wherein the second camera comprises a second camera body and a second lens, and the second lens is mounted on the second camera body; and
    wherein the second camera body comprises a second carrier, a second driving motor and a second chip, and the second driving motor and the second chip are located on the second carrier.

13. The camera assembly of claim 12, wherein the second camera further comprises a second flexible circuit board, and the second flexible circuit board is configured to electrically connect a mainboard of a mobile phone with the camera assembly.

14. The camera assembly of claim 1, wherein a long side of the first camera is opposite to one side of the second camera.

15. A mobile terminal, comprising:
    a body; and
    a camera assembly mounted on the body;
    wherein the camera assembly comprises:
       a first camera;
       a second camera; and
       a camera support comprising a first body and a second body, wherein the first body defines a first accommodating space, the second body defines a second accommodating space, and the first accommodating space and the second accommodating space are separated by a spacing section;
    wherein a first groove extends in a first surface that is of the spacing section and that faces the first accommodating space, a first adhesive is in the first groove, the first camera is accommodated in the first accommodating space, and the first camera is bonded to the spacing section by the first adhesive;
    wherein a second groove extends a second surface that is of the spacing section and that faces the second accommodating space, a second adhesive is in the second groove, the second camera is accommodated in the second accommodating space, and the second camera is bonded to the spacing section by the second adhesive; and
    wherein in an arrangement direction of the first accommodating space and the second accommodating space, the first groove is staggered with the second groove.

16. The mobile terminal of claim 15, wherein a lens of the first camera and a lens of the second camera are exposed out of the body.

17. The mobile terminal of claim 15, wherein the body comprises a middle frame, and the camera assembly is carried by the middle frame.

18. The mobile terminal of claim 15, wherein the spacing section comprises a side surface connecting the first surface to the second surface, and the first groove and the second groove run through the side surface.

19. The mobile terminal of claim 15, wherein the first body comprises a first side wall and a partition wall, the partition wall comprises the spacing section, and the first side wall and the partition wall define the first accommodating space.

20. The mobile terminal of claim 15, wherein the second body comprises a second side wall and the spacing section, and the second side wall and the space section define the second accommodating space.

* * * * *